United States Patent [19]

Cook et al.

[11] 4,066,821

[45] Jan. 3, 1978

[54] TUNGSTEN CARBIDE TOOLS TREATED WITH GROUP IVB AND VB METALS

[75] Inventors: Nathan Henry Cook, Cambridge, Mass.; Bruce M. Kramer, Wantagh, N.Y.

[73] Assignee: Massachusetts Institute of Technology, Cambridge, Mass.

[21] Appl. No.: 651,269

[22] Filed: Jan. 22, 1976

Related U.S. Application Data

[62] Division of Ser. No. 324,889, Jan. 18, 1973, abandoned.

[51] Int. Cl.$^2$ ............................................. C23C 11/08
[52] U.S. Cl. ................................... 428/539; 427/249; 427/399
[58] Field of Search ............... 427/249, 399; 75/203, 75/204, 205; 29/182.2, 182.7, 182.8; 428/539

[56] References Cited

U.S. PATENT DOCUMENTS

| | | | |
|---|---|---|---|
| 2,113,171 | 4/1938 | Cooper | 29/182.8 |
| 3,171,192 | 3/1965 | Ortner et al. | 29/182.2 |
| 3,721,577 | 3/1973 | Woerner | 427/249 |

FOREIGN PATENT DOCUMENTS

| | | | |
|---|---|---|---|
| 2,032,750 | 11/1970 | France | 427/249 |
| 1,170,218 | 5/1964 | Germany | 427/249 |

*Primary Examiner*—Harry J. Gwinnell
*Attorney, Agent, or Firm*—Arthur A. Smith, Jr.; Robert Shaw; David G. Conlin

[57] ABSTRACT

Tungsten carbide tools are provided having improved wear properties which tools produce an improved surface finish on workpieces cut with said tools, both initially and after extended use. The tools are prepared by a process which comprises applying a coating of a Group IVB or VB metal of the Periodic Chart of the Elements over the tool, diffusing said metal into the tool and removing any excess of the metal from the surface of the tool, possibly by further diffusion of the metal into the tool. The preferred method is by gaseous decomposition of a metal halide in an atmosphere which does not contain a carbon source such as methane, used in some previous processes. The source of the carbon in the Group IVB or VB metal carbide is the carbon in the carbide tool being coated. Tools formed in accordance with the invention have wear properties such that they typically last at least four times as long as untreated tools and under most preferred conditions, as much as nine times as long as untreated tools.

26 Claims, 6 Drawing Figures

TUNGSTEN CARBIDE TOOLS TREATED WITH GROUP IVB AND VB METALS

This is a division of application Ser. No. 324,889, filed Jan. 18, 1973, now abandoned.

BACKGROUND OF THE INVENTION

1. Introduction

This invention relates to tungsten carbide tools and to the incorporation of Group IVB and VB metals into said tools.

2. Description of the Prior Art

Most tungsten carbide tools are manufactured by the well known powder metalurgical technique of blending tungsten carbide powders with cobalt powders followed by pressing and sintering. The cobalt acts as a binder for the tungsten carbide powders. In some cases, especially to prevent crater formation, it is known in the art to blend titanium carbide and tantulum carbide powders with the tungsten carbide.

In recent years, it has been suggested that improved tool life of tungsten carbide tools containing titanium carbide was caused by the formation of titanium oxide layers, and in some cases sulfide layers and other oxides, on the surface of the tool. This belief was based upon the showing by electron microscopy that a protective and adherent layer of $Ti_2O_3$ was present as an intermediate layer between a TiC-TiO solid solution on the surface of the carbide tool after cutting.

It has been more recently shown that by application of cutting fluids, sulfide and oxide layers are formed in the contact zone of a carbide cutting tool and an aluminum-deoxidized steel, in which case the sulfide and oxide layers are less than 10 $\mu$m thick. It has been asserted in the prior art that the oxide layer formed on the surface of the tungsten carbide tool raises the welding temperature between the carbide tool and steel by several hundred degrees, thereby decreasing wear by the "adhesion-and-shear" process. In addition, it has also been asserted that TiO is very adherent to the carbide surface of the tool since the sub-surface forms a solid solution of TiO and TiC. Thus, in the prior art, it was believed that the role of the surface layer was that of reducing the frictional coefficients and preventing diffusion and the like between the tool and the workpiece.

With regard to the above described oxide layers, though they are identifiable, the stability of these layers under the shear stresses encountered during normal cutting operations was not considered until recently. Thus, it is conceivable that the oxide layer may not be able to withstand the high shearing stresses encountered in metal cutting for a prolonged period of time and that the rate of oxide formation at the metal to metal contact may not be rapid enough to provide a continuous oxide layer. It was then considered possible that what really effected the metal cutting property was not necessarily the oxide layer alone, but the substrate layer of the carbide effected by mass diffusion of the oxide layer into the carbide tool.

In accordance with the above, the prior art then deliberately attempted to diffuse a titanium oxide layer into a carbide tool by applying a paste of titanium oxide over the surface of the tool and heating the tool to an elevated temperature to thereby diffuse the titanium oxide into the surface. Substantially improved results were obtained.

In addition to the above, it is well known in the art to provide tungsten carbide tools having a layer of another carbide such as titanium carbide displaced over its surface to improve properties such as wear life. These layers are typically formed by gaseous decomposition of the desired metal of the carbide in a carbon atmosphere such as methane. Such tools are disclosed in U.S. Pat. No. 3,604,689. It has been found that where the coating is firmly adhered to the surface of the tool, the wear life is improved and typically is about two times that of an untreated tool. However, difficulty has been experienced with said tools in that there is a tendency for the carbide coating to flake off the tool thereby decreasing its useful life.

With regard to said carbide coated tungsten carbide tools, it has been considered undesirable to diffuse said carbide coating into the body of the tool and such diffusion is prevented or does not take place. This is discussed by McCrary, "T.C. Coatings", Proceedings of the 2nd Carbide Cutting Tool Seminar, Purdue University, June 17-18, 1971.

SUMMARY OF THE INVENTION

In accordance with the subject invention, a Group IVB or VB metal is diffused into the surface of a tungsten carbide tool instead of titanium oxide as discussed above. The results are substantial improvement, both in terms of wear resistance and the surface appearance of workpieces cut with said tools, both initially and after substantial use.

The overall process for making tungsten carbide tools in accordance with the invention comprises applying a coating of a Group IVB or VB metal of the Periodic Chart of the Elements over the tool, diffusing said metal into the tool and removing excess of the metal from the surface of the tool, either by further diffusion of said metal into the tool or by removal processes such as dissolving in a suitable solvent. Tools formed in accordance with process have wear properties such that they typically last at least four times, frequently in excess of six times as long as untreated tools and with tools formed in accordance with the most preferred embodiments of the invention, nine times as long as untreated tools. Tools in accordance with the invention last at least three times as long as tools which have been given an oxide diffusion treatment. The surface of workpieces cut with tools treated in accordance with this invention, are substantially better than those surfaces formed using untreated tools or tools given an oxide diffusion treatment. This improvement is both with initial use of the tool as well as after a substantial cutting time.

DESCRIPTION OF THE PREFERRED EMBODIMENTS

Figure 1:
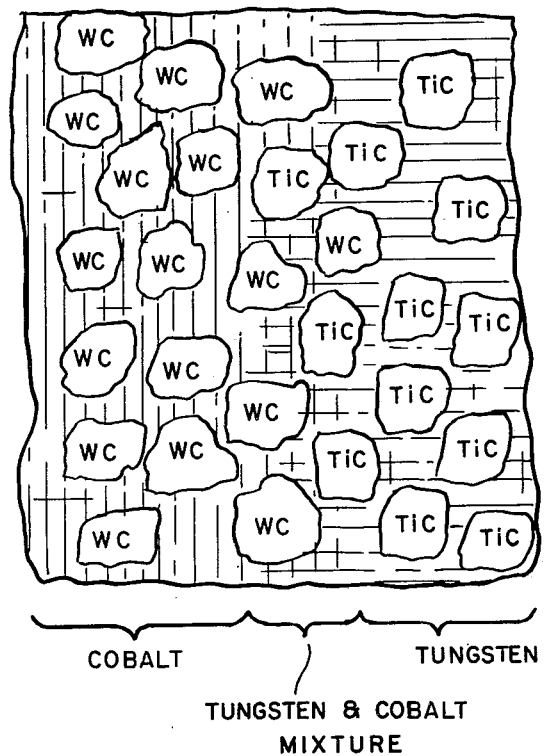
FIG. 1 is a pictorial representation of a tool treated in accordance with the invention and showing the structure resulting from diffusion of the Group IVB or VB metal into the surface of the tool.

The first step in the preparation of tungsten carbide tools in accordance with the process of the invention is the deposition of a layer of a Group IVB or VB metal over the tool, e.g. — a member selected from the group consisting of titanium, zirconium, hafnium, vanadium, niobium, tantalum and mixtures thereof. This can be accomplished by any one of a number of known procedures. Thus, the metal can be deposited by electrodeposition from a fused salt bath, gaseous decomposition preferably of a halide of the Group IVB or VB metal, vacuum decomposition, flame or plasma spraying, dipping into molten metal and the like. The preferred methods are gaseous decomposition of the halide of the Group IVB or VB metals, electrodeposition from a fused salt bath and plasma spraying, gaseous decomposition being most preferred. The thickness of the deposit over the tool is not critical as excess of the metal is removed after the diffusion step. Preferably, the thickness of the coating should be at least 5μm and preferably between 10 and 100μm.

Following the deposition of the metal over the tool surface or simultaneously therewith, the metal is diffused into the interior of the tool. This is accomplished by heating the tool to an elevated temperature, optionally under vacuum and to a temperature varying between about 1500° F to in excess of 10,000° F dependent upon the procedures used. Thus, for deposition from a fused salt bath, temperatures of from 1500° F to 2000° F are preferred. Higher temperatures-e.g., 1800° F to 3000° F suitable for gaseous decomposition. Plasma spraying obviously involves substantially higher temperatures, typically in excess of 10,000° F.

The aforesaid deposition procedures necessarily result in simultaneous diffusion of the metal into the tool surface. Thus, for these methods, deposition and diffusion are simultaneous. It should be understood that with these procedures, deposition temperature and time of treatment are related variables in that the higher the deposition temperature, the more rapid will be the rate of deposition and the rate of diffusion of the metal into the tool. In general, time and temperature are adjusted so that the Group IVB or VB metal diffuses a sufficient distance into the tool, preferably at least 2 μm and more preferably between 5 and 20 μm and undergoes the necessary chemical reactions. This time can be as little as one minute or less with the high temperatures associated with plasma spraying and typical varies between one-half and ten hours for the lower temperature procedures, preferably between two and seven hours, it being understood that higher temperatures require shorter times and lower temperatures, requiring correspondingly longer times.

As noted above, the metal deposition step and the step of diffusing the metal into the surface of the tool are preferably simultaneous, however the diffusion step can be continued after deposition or may be a totally separate step.

Following diffusion of the Group IVB or VB metal into the tool surface, the excess surface metal is removed. This is necessary as the Group IVB and VB metals are soft relative to the tool and would interfere with the cutting operation if not removed, in that it would wear rapidly leaving a large contact zone between the tool and workpiece. This would result in more friction and a higher cutting temperature. The method of removing excess metal is not critical For the Group IVB metals, an acid etch such as a mixture of hydrofluoric acid an nitric acid is satisfactory. For the Group VB metals, immersion in a caustic solution is suitable. Alternatively, rather than exterior removal of excess metal, the excess metal may be diffused into the interior of the tool by addition diffusion techniques following the procedures noted above.

Though not wishing to be bound by theory, it is believed that as the Group IVB or VB metal diffuses into the tool, it reduces the tungsten carbide to metallic tungsten immediately beneath the surface of the tool with formation of a corresponding Group IVB or VB carbide. The tungsten is believed to enter the binder phase forcing the cobalt binder deeper into the tool. As a result, immediately below the surface of the tool, there is a refractory tungsten binder which acts to cement the carbide powders, thereby providing a tool of improved wear resistance that produces an improved surface appearance on workpieces cut with said tool.

The above is pictorially represented in FIG. 1 of the drawings which is of substantially exaggerated dimension. As shown, using titanium carbide for purposes of illustration only, there are particles of primarily titanium carbide at the surface of the tool. With deeper penetration into the tool, the frequency of the titanium carbide particles decreases as the frequency of the tungsten carbide particles increases. Finally, as the tool is penetrated further, substantially all of the particles are tungsten carbide particles. With respect to the binder, horizontal hatching has been used to represent tungsten and vertical hatching has been used to represent cobalt. At the surface of the tool, the binder is rich, in tungsten. As the tool is penetrated, the concentration of the cobalt increases until the binder is essentially all cobalt. There is a gradient phase of cobalt and tungsten between the cobalt and tungsten phases.

It should be understood that FIG. 1 represents a tool that is believed to be formed by the process of the invention. The relative concentration of the tungsten carbide and titanium carbide as well as the tungsten and cobalt in the binder phase are not set forth quantitatively, but ideally for purposes of illustration only.

Figure 2:
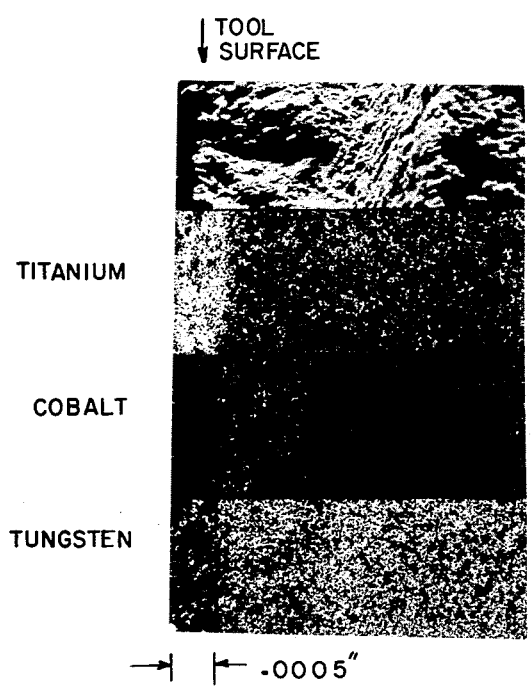
FIG. 2 is similar to FIG. 1 but the effects are shown by photomicrograph resulting from electron microprobe analysis.

FIG. 2 of the drawings in a photomicrograph of an electron microprobe analysis of a tool having titanium diffused into its surface. The microprobe analysis was combined with x-ray diffraction analysis to determine the composition of the tool surface. The photomicrograph is at a 670 magnification. Before discussing this analysis, it should be understood that electron microprobe analysis is used to determine total metal content, whether it is in the form of elemental metal or carbide. The x-ray diffration analysis distinguishes between elemental metal and metal in the form of a carbide. Thus, the photomicrograph shows the tool surface zone in terms of metal whether it is in the form of the carbide or elemental metal.

With reference to FIG. 2, there is shown a layer at the surface of the tool approximately 0.0005 inch thick (hereinafter referred to as the "0.0005 inches layer") which consists of titanium carbide in a tungsten binder substantially devoid of cobalt. With specific reference to the zone representing titanium, it can be seen that the 0.0005 inch layer is rich in titanium. X-ray diffraction analysis shows this to be in the form of titanium carbide. Penetration deeper into the tool shows the presence of titanium but this is titanium that was originally present in the tool, (prior to treatment) as well as background scattering. The zone for cobalt shows that the 0.0005 inch layer is depleted in cobalt, though penetrating deeper into the tool, there is a cobalt rich layer which blends smoothly into the substrate cobalt. Finally, with respect to the tungsten zone, there is the 0.0005 inch layer rich in tungsten which x-ray diffraction analysis shows to be in the form of metallic tungsten. Penetrating deeper into the tool shows the presence of tungsten which x-ray diffraction analysis shows to be in the form of tungsten carbide. Thus, it can be concluded that at the elevated temperatures used to diffuse the titanium into the tool, the metallic titanium reduces tungsten carbide to metallic tungsten with the formation of titanium carbide at the surface. The metallic tungsten which is liberated then displaces the cobalt binder and forces it deeper into the tool. This provides a hard, coherent refractory surface layer with a thin, tough cobalt rich backing and a stiff substrate of the original tool material.

The invention will be better illustrated by the following examples. In the examples, a tungsten carbide tool was used that was ½ × ½ × ½ inch in size. The tool was obtained commercially. It contained 79% by weight tungsten carbide, 5% cobalt, 7.6% tantalum carbide, 5.8% titanium carbide and 2.5 niobium carbide. Preferably, before treatment, the tool is cleaned such as by polishing with a six micron diamond polishing compound to remove oily films.

The aforesaid tool was coated with titanium by electrodeposition from a fused salt bath employing the method of B. J. Fortin et al, "Electrodeposition of Adherent Titanium Coatings on Induction Heated Cathodes in Fused Salts", Journal of Electrochemical Society, Volume 106, No. 5, May, 1959. Following this procedure, the plating material is provided by a soluble anode of titanium metal and the electrolyte consists of a eutetic mixture of potassium iodide and potassium fluoride. The tool to be plated serves as a cathode and is surrounded by an induction heater. The bath is maintained in a molten state by induction heating of the tool during plating. This maintains the tool at a significantly higher temperature than the surrounding electrolyte and promotes diffusion of titanium into the tool surface simultaneously with the plating of the titaniuum onto the surface. An argon atmosphere is preferably maintained over the surface of the electrolyte. Following this procedure, shiny adherent and somewhat uneven titanium coatings are obtained. The optimum plating current is found to be approximately 1 amp/in$^2$ and best results are obtained at the maximum tool temperature which, due to the nature of the plating apparatus, was approximately 1800° F. The plating procedure was carried out for a period of 4 hours during which time the titanium diffused into the surface of the tool to a depth of about 0.0005 inches. Following plating, the titanium on the surface of the tool was removed by etching with a 1:3 mixture of hydrofluoric acid and nitric acid.

A second tool was treated by coating the same by gaseous decomposition of titanium tetraiodide. In this procedure, the tool is placed in a pyrex reaction vessel charged with titanium metal and iodine crystals. The tool is surrounded by an induction heater. The chamber is then evacuated and sealed. The entire vessel is placed in a steam jacket which maintains the wall temperature at 100° C. This temperature produces sufficient titanium tetraoidide vapor pressure for a substantial deposition rate, but yet is low enough so that the formation of the tetraiodide is favored over that of lower iodides. The plating proceeds in four steps comprising the formation of the titanium tetraiodide in the reaction vessel, the transport of the titanium tetraiodide vapor to the induction heated tool surface, the decomposition of the titanium tetraiodide to titanium and iodine at the surface of the tool and the transport of the iodine to the raw titanium metal to form additional titanium tetraiodide.

By use of the induction heater displaced around the tool during the deposition, the tool is maintained at an elevated temperature such that the titanium diffuses into the tool simultaneously with deposition. In the above procedure, the tool is maintained at a temperature slightly above about 2200° F and deposition is over a 7 hour period. However, temperatures above 3,000° F have also been used, but in these particular experiments, results were not as satisfactory as there was too heavy a build-up of titanium which was difficult to remove with the etching solution. This build-up is undesirable in that it is significantly softer than the substrate material.

Following the deposition of the titanium onto the surface of the tool and the simultaneous diffusion of the titanium into the tool, excess titanium is removed by immersion in an etchant of hydrofluoric acid and nitric acid in a 1:3 ratio. It is found that the titanium diffused about 0.0005 inches into the surface of the tool. Alternatively, the excess titanium can be diffused into the tool by holding the tool at an elevated temperature following deposition.

Figure 3:
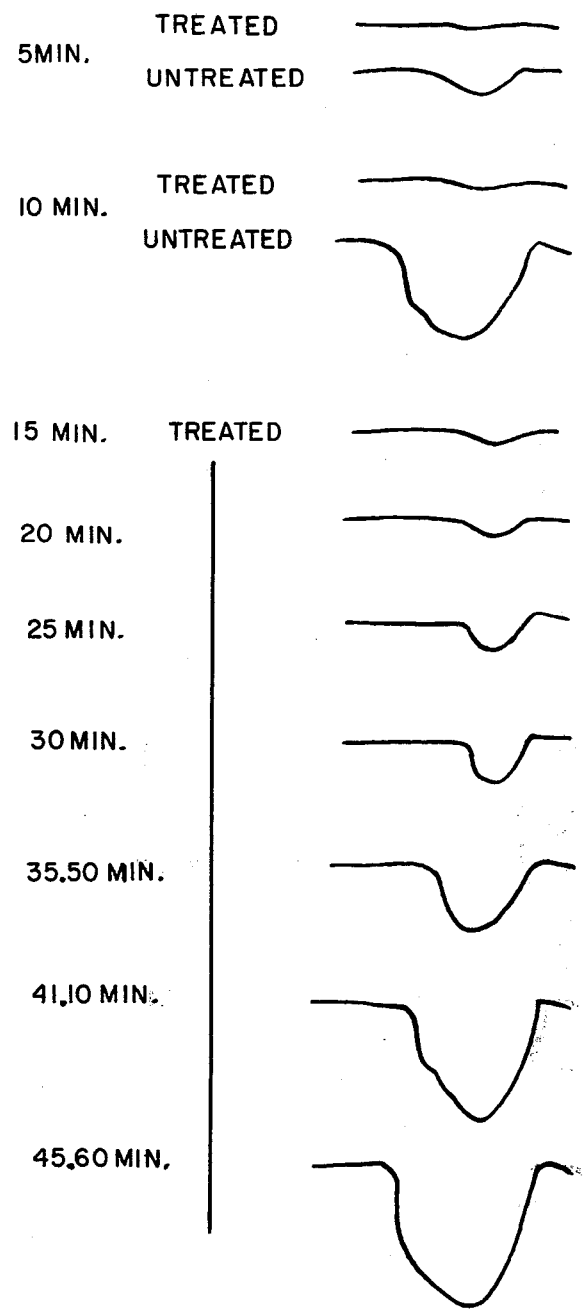
FIG. 3 shows comparative crater profiles for tools treated with titanium metal and untreated tools.

The wear characteristics of tools treated in accordance with the invention and untreated tools are shown diagramatically in FIG. 3. For purposes of comparison, tools prepared in accordance with the gaseous decomposition procedures and untreated tools are used. For the test, a lathe was used for metal cutting. Depth of cut using the lathe was 0.05 inches on heat-treated 4340 steel. The feed was 0.005 inches per revolution at a cutting speed of 700 feet per minute. No cutting fluid was used.

With reference to FIG. 3, there is shown comparative crater profiles for both an untreated tool (until failure) and the same tool treated in accordance with the invention. It can be seen that after 10 minutes of cutting, the untreated tool had a deep crater and there was failure of the tool such that the test was discontinued. By comparison, there was little or no crater formation with the treated tool after 10 minutes. The test was continued for the treated tool for a total cutting time of 45.60 minutes at which time the test was discontinued.

Figure 4:
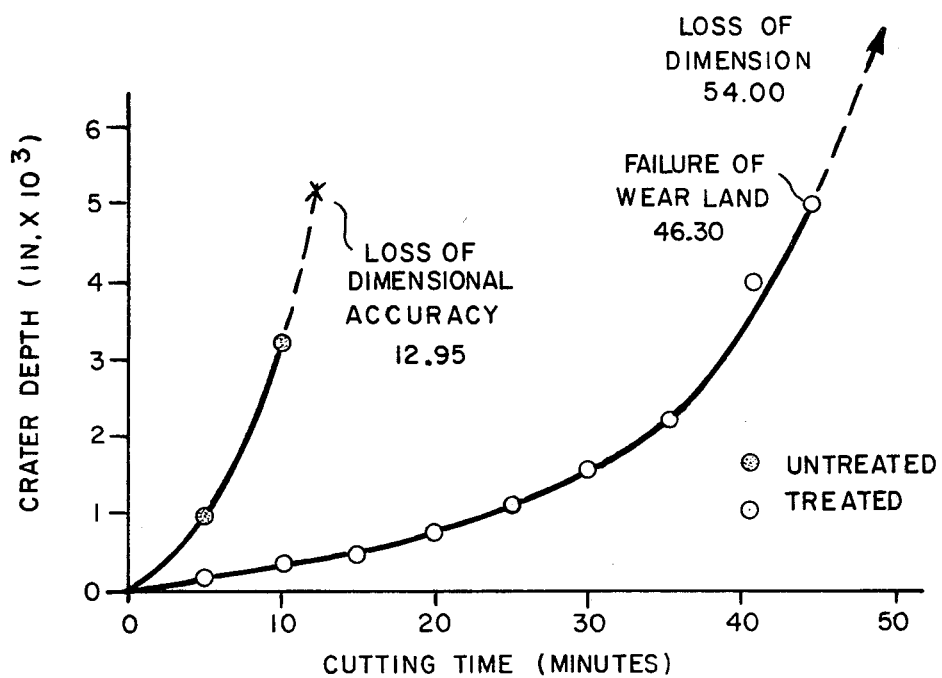
FIG. 4 is graphical representation of crater depth for the treated and untreated tools used for FIG. 3 as a function of cutting time.

The results shown in FIG. 3 are reproduced in FIG. 4 which is a graphical representation of crater depth as a function of cutting time for both the untreated and treated tool. It should be noted that there was a crater depth of approximately 3.2 inches × 10$^{-3}$ after 10 minutes of cutting with the untreated tool. It took about 40 minutes to obtain substantially the same crater depth with the treated tool. Thus, there is about a 400% improvement using the tool prepared in accordance with the subject invention. Approximately the same percentage increase applies to the loss of dimensional accuracy.

Figure 5:
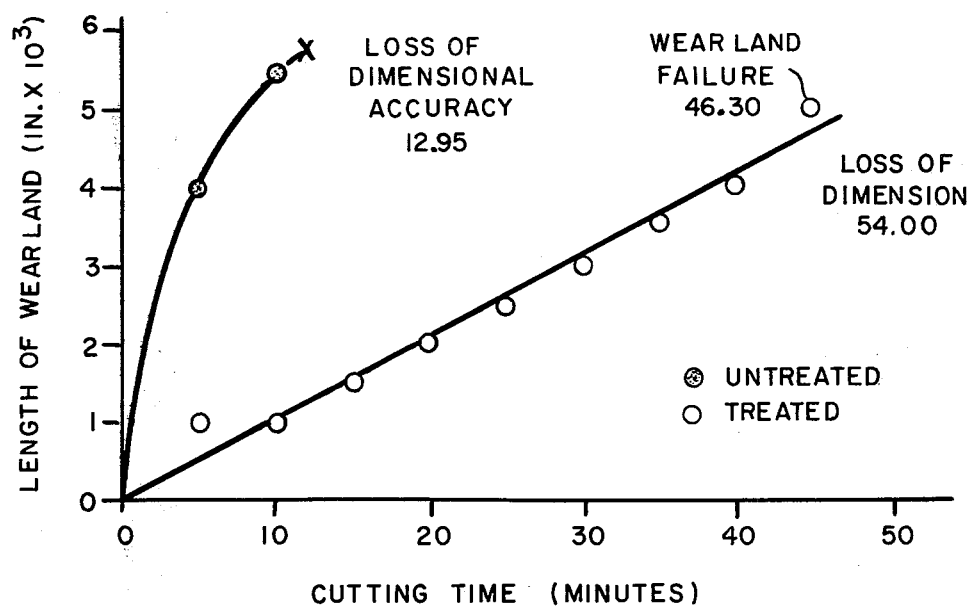
FIG. 5 is a graphical representation of the length of wear land for the treated and untreated tools used for FIG. 3 as a function of cutting time.

FIG. 5 of the drawings graphically represents the length of wear land as a function of cutting time for both the treated and untreated tools. Comparison of the curves for the untreated and treated tool again shows about a 400% improvement for this particular wear property.

Figure 6:
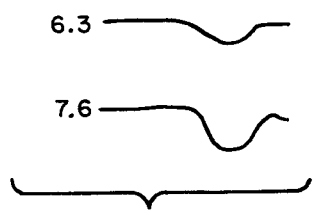
FIG. 6 is similar to FIG. 3, but shows crater profile for a tool treated with hafnium.

The gaseous decomposition procedures set forth above for titanium coating were repeated substituting hafnium for titanium. The treatment time was reduced to 3 hours. Comparative crater profiles are set forth in FIG. 6. The number beside each crater profile represents a multiple of the time it took for failure of the untreated tool. In other words, the untreated tool filed in 7 minutes cutting time. The first crater profile represented in the drawing in 6.3 times 7 minutes of 44.1 minutes. The second crater profile was at 7.6 times the time for failure of the untreated tool. Though not represented, the hafnium treated tool lasted in excess of 9 times the untreated tool for at least a 900% improvement. Similar results are obtained substituting any of zirconium, vanadium, niobium, or tantalum for titanium or hafnium.

We claim:

1. A method for forming a coating of a Group IVB or VB metal carbide on a carbide tool, said method comprising the steps of applying a Group IVB or VB metal to the surface of said tool by vapor deposition in an atmosphere which consists essentially of a halide of the Group IVB or VB metal and elemental halogen, and diffusing said metal into said tool at a temperature which is sufficient to permit formation of the Group IVB or VB metal carbide, the source of the carbon in said Group IVB or VB metal carbide being the carbon in said carbide tool.

2. The method of claim 1 where the metal is of a Group IVB metal.

3. The method of claim 2 where the metal is titanium.

4. The method of claim 1 where the metal is hafnium.

5. The method of claim 1 where the metal is a Group VB metal.

6. The method of claim 1 wherein the carbide tool is a tungsten carbide tool.

7. The method of claim 6 where the metal is a Group IVB metal.

8. The method of claim 6 wherein the metal is titanium.

9. The method of claim 6 wherein the metal is hafnium.

10. The method of claim 6 wherein the metal is a Group VB metal.

11. A hafnium carbide coated tool made by the process of claim 4.

12. The method of claim 1 where the metal is applied to the tool and simultaneously diffused into said tool.

13. The method of claim 1 where the metal is diffused into the tool subsequent to application to the tool.

14. The method of claim 12 where the temperature and time relationship for applying the metal to the surface of the tool and for diffusing said metal onto the tool are sufficient to diffuse the metal at least 2 $\mu$m into the surface of the tool.

15. The method of claim 12 where the temperature and time relationship for applying the metal to the surface of the tool and for diffusing said metal into the tool are sufficient to diffuse the metal from 5 $\mu$m to 2 $\mu$m into the surface of the tool.

16. The method of claim 12 where the temperature is at least 1500° F.

17. The method of claim 16 where the temperature varies between 1500° F and 3000° F.

18. The method of claim 16 where the temperature varies between 1525° F and 2250° F.

19. The method of claim 16 where the time is at least one minute.

20. The method of claim 16 where the time varies between ½ and 10 hours.

21. The method of claim 20 where the time varies between 2 and 4 hours.

22. The method of claim 1, further comprising removing Group IVB or VB metal that has not diffused into said tool from the surface of said tool.

23. The method of claim 22 where the metal is removed by diffusing it into the tool.

24. The method of claim 22 where the metal is removed with an acid dip.

25. The method of claim 22 where the metal is removed with a caustic dip.

26. The method of claim 1 wherein a layer of Group IVB or VB metal is deposited in free metal form.

* * * * *

UNITED STATES PATENT OFFICE
CERTIFICATE OF CORRECTION

PATENT NO. : 4,066,821
DATED : January 3, 1978
INVENTOR(S) : Nathan Henry Cook; Bruce M. Kramer It is certified that error appears in the above–identified patent and that said Letters Patent are hereby corrected as shown below:

In column 1, after line 6, insert the following paragraph:

-- The Government has rights in this invention pursuant to Grant No. GK-29379 awarded by the National Science Foundation. --

Signed and Sealed this

Twentieth Day of June 1978

[SEAL]

Attest:

RUTH C. MASON
Attesting Officer

DONALD W. BANNER
Commissioner of Patents and Trademarks